United States Patent [19]

Sakaguchi et al.

[11] Patent Number: 5,416,553
[45] Date of Patent: May 16, 1995

[54] PHOTOSENSITIVE MATERIAL PROCESSING APPARATUS

[75] Inventors: Yasunobu Sakaguchi, Kanagawa; Shinichi Yorifuji; Sizuo Sekino, both of Saitama, all of Japan

[73] Assignees: Fuji Photo Film Co., Ltd., Kanagawa; Fuji Photo Optical Co., Ltd., Saitama, both of Japan

[21] Appl. No.: 178,905

[22] Filed: Jan. 7, 1994

[30] Foreign Application Priority Data

Jan. 19, 1993 [JP] Japan .................. 5-006474

[51] Int. Cl.⁶ .................. G03D 3/08; G03D 13/08
[52] U.S. Cl. .................. 354/321; 354/340; 354/345
[58] Field of Search .................. 354/275, 319–324, 354/340, 333, 345; 355/75

[56] References Cited

U.S. PATENT DOCUMENTS

3,769,897  11/1973  Zwettler et al. .................. 354/322
4,519,688   5/1985  Kitch et al. .................. 354/297

Primary Examiner—D. Rutledge
Attorney, Agent, or Firm—Sughrue, Mion, Zinn, Macpeak & Seas; Richard C. Turner; Marc Kaufman

[57] ABSTRACT

A photosensitive material processing apparatus of the present invention includes an apparatus main body for processing a photosensitive material as the material is being conveyed, a magazine capable of supplying the photosensitive material to the apparatus main body, a shutter capable of opening and closing an opening portion of the magazine, an opening and closing claw for engaging the shutter and moving upon the mounting of the magazine to thereby open and close the shutter, conveying rollers capable of nipping the photosensitive material extending from the magazine when the magazine is mounted, a coupling member disposed for coupling the opening and closing claw and the conveying rollers and moving to and fro so as to shift the opening and closing claw integrally with nipping and separating actions of the conveying rollers, and a operation assembly for moving the coupling member to and fro while abutting against the coupling member so as to move the opening and closing claw and effect nipping and separating actions of the conveying rollers. It is therefore possible to nip the photosensitive material by the conveying rollers integrally with the opening and closing actions of the shutter, thus achieving a reduction in labor during the operation.

16 Claims, 9 Drawing Sheets

PHOTOSENSITIVE MATERIAL PROCESSING APPARATUS

BACKGROUND OF THE INVENTION (1) Field of the Invention

The present invention relates to a photosensitive material processing apparatus which allows easy attachment of a magazine accommodating a long roll of photosensitive material therein to the apparatus main body, and in particular a photosensitive material processing apparatus applicable to photographic printers, printer processors, etc.

(2) Description of the Prior Art

Photosensitive material processing apparatuses such as a printer processor are called mini-labs and are found in photo processing shops and the like. This printer processor integrally includes a printer portion for enlarging images recorded on a negative film to a selected predetermined size, exposing and printing the images onto printing paper and a developing processor portion for continuously conveying the printing paper having images exposed and developed thereon. Accordingly, this printer processor, by merely setting a long roll of printing paper into the printer processor, allows the printer portion and processor portion to automatically convey and process the printing paper thereby providing photographic prints.

In a printer processor of this type, the printing paper is successively drawn out from a magazine which accommodates the printing paper in roll-form and with light blocked out therefrom every time exposure and printing is carried out in the printer portion. The printing paper thus drawn out from the magazine is nipped and conveyed by conveying rollers and stopped each time an image is to be exposed and printed thereon. The printing paper is then subjected in the processor portion to further processing such as development processing, bleach-fixing processing and rinse processing. Thereafter drying processing is carried out.

In a conventional printer processor of this type, the printing paper wound onto a reel is processed while being conveyed from the inside of the magazine by conveying rollers. Therefore, the leading end of the printing paper must be nipped by the conveying rollers after the attachment of the magazine to the apparatus main body.

It is also possible that the leading end of the printing paper could be nipped between the conveying rollers in advance of the attachment of the magazine. Thereafter the paper can be conveyed by the rotation of the conveying rollers. In this case, however, the printing paper could be inserted improperly into the nip portion between the conveying rollers. As a result, the printing paper might be conveyed in a zig-zag manner or be bent.

In order to process the printing paper properly and obtain images of high quality, the printing paper must be conveyed appropriately by preventing the paper from advancing in a zig-zag manner or being bent inside the printer processor. To achieve this, it is necessary to position the magazine with high precision relative to the printer processor. It is also necessary to secure the magazine so as to maintain the posture thus positioned.

On the other hand, if the reel races in the magazine before the attachment of the magazine to the printer processor, the leading end of the printing paper might be pulled into the inside of the magazine or be excessively ejected out therefrom. Accordingly, in order to prevent the pulling-in or ejecting-out of the printing paper due to the spinning of the reel, in the conventional apparatus a shutter capable of opening and closing was provided at an opening portion from which the printing paper is to be drawn out. This shutter is adapted to nip the printing paper before the attachment of the magazine to the printer processor, and open when the magazine is attached so as to allow the printing paper to be conveyed.

In the prior art, each action, i.e., the nipping action of the conveying rollers, the securing action of the magazine and the opening and closing operation of the shutter is carried out separately when the magazine is attached to the printer processor. This requires a lot of laborious handling.

SUMMARY OF THE INVENTION

In view of the above, it is an object of the present invention to provide a photosensitive material processing apparatus in which the nipping of a printing material by conveying rollers, the securing of a magazine and the opening and closing of a shutter is carried out in an integral manner when the magazine is attached to the apparatus body.

In accordance with a first feature of the present invention, a photosensitive material processing apparatus can be provided which comprises: an apparatus main body for processing a long-rolled of photosensitive material as the material is being conveyed; a magazine which can be detachably mounted to the apparatus main body for accommodating the photosensitive material and supplying the photosensitive material to the apparatus main body; a shutter capable of opening and closing an opening portion through which the photosensitive material is drawn from the magazine; an opening and closing claw, movably supported in the apparatus main body for opening and closing the shutter, and engaging the shutter so as to move the shutter upon the mounting of the magazine; conveying rollers supported in the apparatus main body for nipping the photosensitive material protruding from the magazine when the magazine is mounted, the conveying rollers being capable of moving forward and away from each other; a coupling member disposed for coupling between the opening and closing claw and the conveying rollers and moving reciprocally so as to effect an operation of moving the opening and closing claw simultaneously with one of an operation of causing the conveying rollers to nip the photosensitive material; and an operation assembly for moving the coupling member back and forth while abutting against the coupling member so as to move the opening and closing claw and effect nipping and separating actions of the conveying rollers.

In other words, the magazine accommodating a long roll of photosensitive material and capable of supplying the photosensitive material is mounted detachably to the apparatus main body, which processes the photosensitive material while conveying the photosensitive material from the magazine.

On the other hand, the shutter can be freely opened and closed and may shut the opening portion through which the photosensitive material is drawn from the magazine. Upon the attachment of the magazine to the apparatus main body, the opening and closing claw engages the shutter and releases the shutter. Further, at the time the magazine is attached to the apparatus main body, the photosensitive material extending out from the magazine is nipped by the conveying rollers.

Subsequently, the coupling member against which the operation assembly abuts moves back and forth so that the coupling member integrally causes movement of the opening and closing claw and the nipping and separating actions of the conveying rollers.

More specifically, when the magazine is mounted to the apparatus main body, the operation assembly is operated so as to move the coupling member back and forth. The opening and closing claw is thereby moved so as to release the opening portion while the conveying rollers are drawn close to one another. On the other hand, when the magazine is removed from the apparatus main body, by operating the operation assembly to move the coupling member back and forth, the opening and closing claw is moved so as to close the opening portion while the conveying rollers are separated from one another.

In accordance with a second feature of the present invention, a photosensitive material processing apparatus can be provided which comprises: an apparatus main body for processing a long-rolled of photosensitive material as the material is being conveyed; a magazine which can be detachably mounted to the apparatus main body for accommodating the photosensitive material and supplying the photosensitive material to the apparatus main body; an engaging projection integrally formed with the magazine; an engaging claw which is supported in the apparatus main body and couples with the engaging projection when the magazine is mounted to the apparatus main body; a shutter capable of opening and closing an opening portion through which the photosensitive material is drawn from the magazine; an opening and closing claw, movably supported in the apparatus main body for opening and closing the shutter, and engaging the shutter so as to move the shutter upon the mounting of the magazine; conveying rollers supported in the apparatus main body in such a manner as to draw close to and separate from each other and being capable of nipping the photosensitive material protruding from the magazine when the magazine is mounted; and an operation assembly which is linked with the engaging claw so as to release the engagement of the engaging claw to thereby free the interlock of the magazine with the apparatus main body and which is connected respectively to the opening and closing claw and the conveying rollers so as to shift the opening and closing claw and effect nipping and separating actions of the conveying rollers.

In other words, similar to the first feature of the present invention, the shutter may open and close so as to shut the opening portion through which the photosensitive material is drawn from the magazine while the conveying rollers hold therebetween the end portion of the photosensitive material extending from the magazine.

Further, in this embodiment, when the magazine is attached to the apparatus main body, the engaging claw disposed in the apparatus main body engages the engaging projection to thereby fix the magazine to the apparatus main body. On the other hand, when the magazine is removed from the apparatus body, by operating the operation assembly, the opening and closing claw is moved so as to close the opening portion while the conveying rollers are separated. At the same moment, the engagement of the engaging claw is released such that the locking of the magazine to the apparatus body is released.

DETAILED DESCRIPTION OF THE PREFERRED EMBODIMENTS

A first embodiment according to the present invention of a photosensitive material processing apparatus as used in mini-labs will hereinafter be described with reference to FIGS. 1 to 9.

Figure 1:
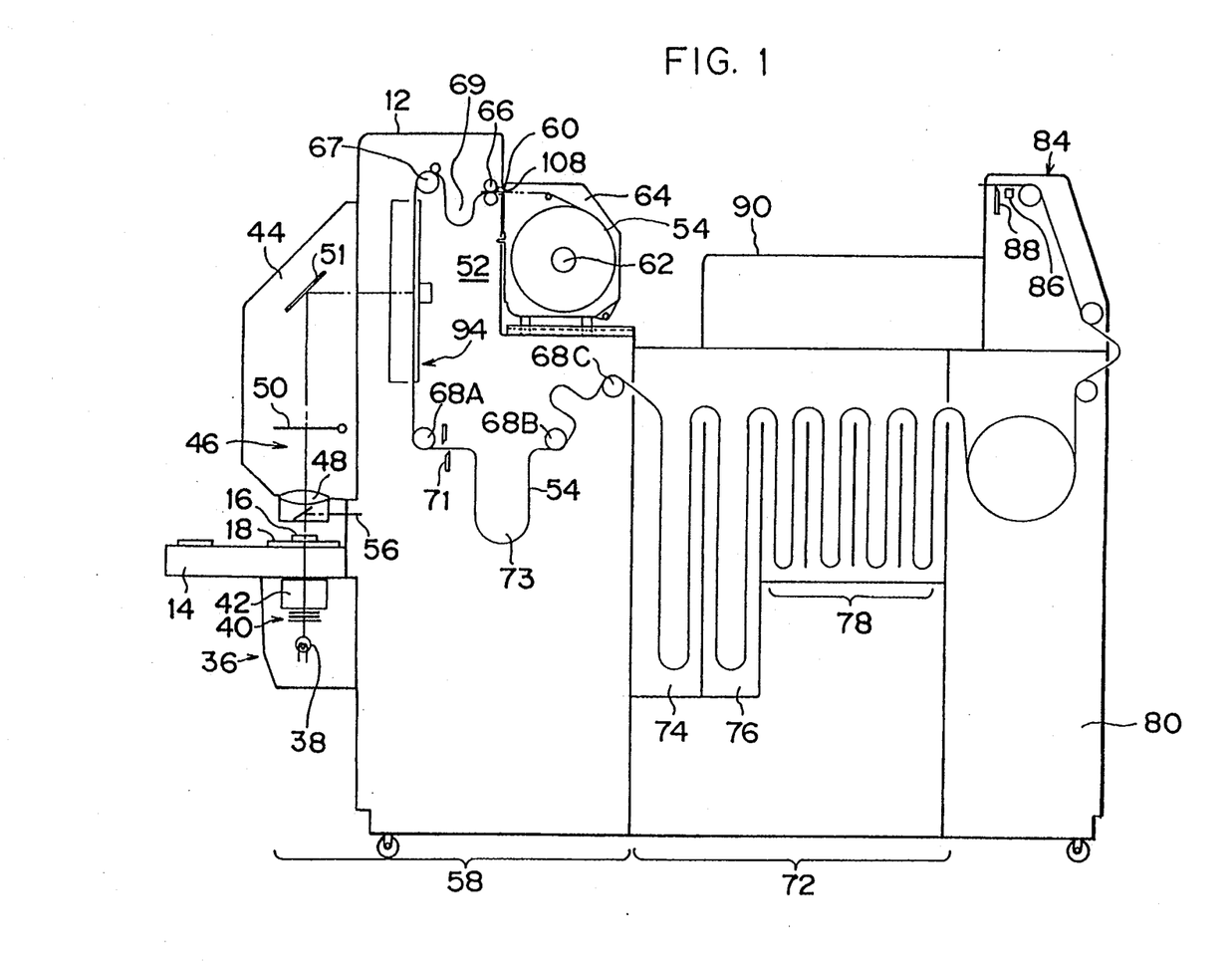
FIG. 1 is a schematic structural view showing a printer processor according to a first embodiment of the present invention.

FIG. 1 shows a printer processor 10 according to a first embodiment. Initially, the whole configuration of the printer processor 10 will be described.

The printer processor 10 is housed in a casing 12. A work table 14 projects from the casing 12 on the left side as seen in FIG. 1. A negative carrier 18 is mounted on the upper surface of the work table 14. A negative film 16 is set on the negative carrier 18. A light source unit 36 is provided under the work table 14. The light source unit 36 includes a light source 38 which emits a light beam The light beam passes through a filter portion 40, and a diffusion cylinder 42 before reaching the negative film 16 set on the negative carrier 18. The filter portion 40 is composed of three filters: cyan (C), magenta (M) and yellow (Y) Each filter is capable of being inserted into and retracted from the optical axis of the light beam.

An arm 44 positioned above the work table 14 is provided with an optical system 46. The optical system 46 is comprised of a lens 48, a shutter 50 and reflection mirror 51. Here, the lens 48 and shutter 50 are disposed on the optical axis of the light beam. The light beam having passed through the negative film 16 passes through the lens 48 and shutter 50 to be deflected by the reflection mirror 51 at substantially 90 degrees with respect to the optical axis thereby forming an image that is on the negative film 16 onto printing paper 54 which is set on an exposure stage 94 of an exposure room 52.

The optical system 46 includes a densitometer 56 such as a CCD or the like for measuring the density of the negative film 16. This densitometer 56 is connected to an unillustrated controller which allows a corrective exposure value at the time of exposure to be set based on data measured by the densitometer 56 and data inputted by the operator via a key board.

The light source unit 36, the optical system 46 and the exposure room 52 constitute a printer portion 58 making print processing possible.

Disposed at a corner of the right upper side of the exposure room 52 is a magazine attachment portion 60 to which a paper magazine 64 for accommodating long printing paper 54 wound in roll form around a reel 62 is attached.

In a vicinity of the magazine attachment portion 60 a pair of rollers 66 serving as conveying rollers is disposed so as to nip the printing paper 54 and convey it horizontally into the exposure room 52. The printing paper 54 is wound on a roller 67 just in front of the arm 44 in such a manner that the paper 54 is turned 90 degrees so as to move in a downward direction. Between the rollers 66 and roller 67 is a first stock portion 69 in which the printing paper 54 is guided in a substantially U-shape so as to be stocked.

The exposure stage 94 is located on the downstream side of the roller 67 in a guiding direction of the printing paper 54. This exposure stage 94, which is connected to an unillustrated controller, is provided with a variable mask (not shown) which opens and closes. Therefore, the controller is adapted to vary the length and width of the mask range of the variable mask in accordance with print size and print type (e.g., the presence or absence of a white frame).

Disposed below the exposure stage 94 of the exposure room 52 are rollers 68A, 68B and 68C, each of which changes the advancing direction of the printing paper 54 having images of the negative film 16 printed thereon by approximately 90 degrees so that the printing paper 54 is conveyed into a color development portion 74 in a processor portion 72 next to the exposure room 52.

A cutter 71 is provided on the downstream side of the roller 68A. The cutter 71 serves to cut the rear end of the printing paper 54 after the paper 54 has undergone exposure processing. This makes it possible for the printing paper 54 left inside the exposure room 52 to be rewound into the magazine 64.

The printing paper 54, having been subjected to print processing, is guided so as to be stocked in a substantially U-shape between rollers 68A and 68B thereby forming a second stock portion 73. This second stock portion 73 of the printing paper 54 serves to absorb the difference between processing times of the printing process in the printer portion 58 and the processes of development, bleach-fixing and rinsing effected in the processor portion 72.

The color developing portion 74 develops the printing paper 54 by immersing the paper 54 into the developer. The developed printing paper 54 is then conveyed to a bleach-fixing portion 76 adjacent to the color developing portion 74. In the bleach-fixing portion 76 the printing paper 54 is immersed in a bleach-fixing solution so as to be bleach processed and fixed. The fixed printing paper 54 is next conveyed to the rinsing portion 78 next to the bleach-fixing portion 76, where the printing paper 54 is immersed in washing water so as to be rinse processed.

The rinsed printing paper 54 is thereafter conveyed to a drying portion 80 adjacent to the rinsing portion 78. In the drying portion 80 the printing paper 54 is wound around a drum and high-temperature air is blown thereto for drying. The dried printing paper 54 is then nipped between a pair of unillustrated rollers so as to be discharged from the drying portion 80. A cutter portion 84 is positioned on the downstream side of the drying portion 80 and is comprised of a cut mark sensor 86 for sensing the cut marks on the paper 54 and a cutter 88 for cutting the printing paper 54 at each image frame. The thus cut sheets of paper are then discharged outside the casing 12 of the printer processor 10.

The cut sheets of printing paper 54 are thereafter sorted by a sorter portion 90.

As shown in FIGS. 2 to 5, the paper magazine 64 of this embodiment accommodates a long roll of printing paper 54 wound on reel 62. An opening portion 106 is provided at an upper portion of a front surface side 64A of the paper magazine 64 through which an end of the printing paper 54 projects out from the inside of the paper magazine 64. A covering plate 102 is provided over the front side 64A of the paper magazine 64 so as to form a space extending in a vertical direction and having a substantially U-shaped cross-section. A stopper 108 which is longer than the width of the printing paper 54 is provided as a shutter to be fit in the space.

A guide pin 105 penetrates through the stopper 108. The lower end of the guide pin 105 passes through a rib 104 formed on the front surface side 64A and is fixed at its lowermost portion to an engaging member 109. Respectively wound between the stopper 108 and rib 104 and in the guide pin 105 between the engaging member 109 and rib 104 are spiral springs 110 and 111 respectively.

The pressure force of the spring 110 is stronger than that of the spring 111. Therefore, if no external force is exerted, the stopper 108 is urged upward so that the printing paper 54 is nipped against the lower side of the opening portion 106 by the upper side of the stopper 108. Accordingly, this stopper 108 secures an end of the printing paper 54 and also prevents light from entering the inside of the magazine 64. Here, an engaging member projects from the side of the printer processor 10 and engages an engaging pin 182 which is vertically moved by the operation of the printer processor 10 so that the engaging member 109 may be pressed downward by the operation of the engaging pin 182.

At a center portion of the front surface side 64A of the paper magazine 64 there is a positioning pin 112, serving as a positioning member, which is inserted into an elongated hole 138 of the magazine attachment portion 60 constituting a part of the printer processor 10 or apparatus main body and which positions the paper magazine 64 relative to the body when the paper magazine 64 is attached thereto. The distal end of the positioning pin 112 is beveled or tapered so as to permit easy guidance thereof when it is mated with the attachment portion 60.

A pair of positioning plates 116 are fixed symmetrically at the lower portion of the front surface side 64A so as to project outward and on a plane defined by the front side 64A. An engaging shaft 118 having a flange 120 at its distal end is a shaft-shaped engaging projection securely provided at each planar surface of the positioning plates 116 in such a manner that the engaging shafts 118 project horizontally outward in opposite directions. Accordingly, the engaging shafts 118 are constructed as shaft members which are adapted to mate with engaging claws 146 formed in coupling plate 61.

Figure 3:
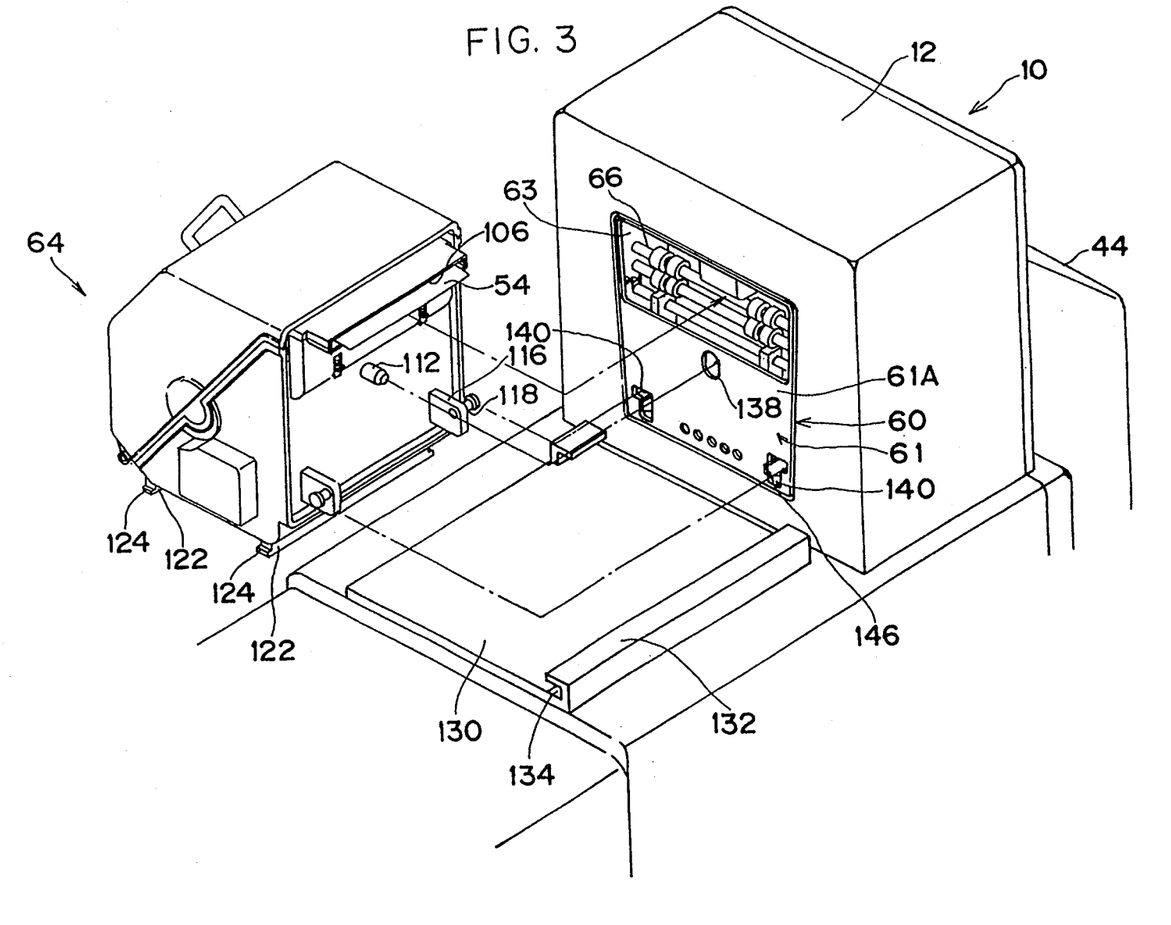
FIG. 3 is another perspective view showing a paper magazine according to the first embodiment of the present invention.

On the other hand, as shown in FIG.3, an attachment face 61A serving as the surface of the coupling plate 61 both of which constitute the magazine attachment portion 60, is formed with a vertically elongated hole 138 into which the positioning pin 112 is inserted so as to be mated therewith. On both sides of the attachment face 61A below the vertically elongated hole 138 a pair of L-shaped holes 140 are formed which correspond to a pair of positioning plates 116 having flanges 120. Formed above the elongated hole 138 is a feeding port 63 into which the printing paper 54 is inserted. The inserted printing paper 54 is nipped and conveyed by rollers 66.

Figure 4:
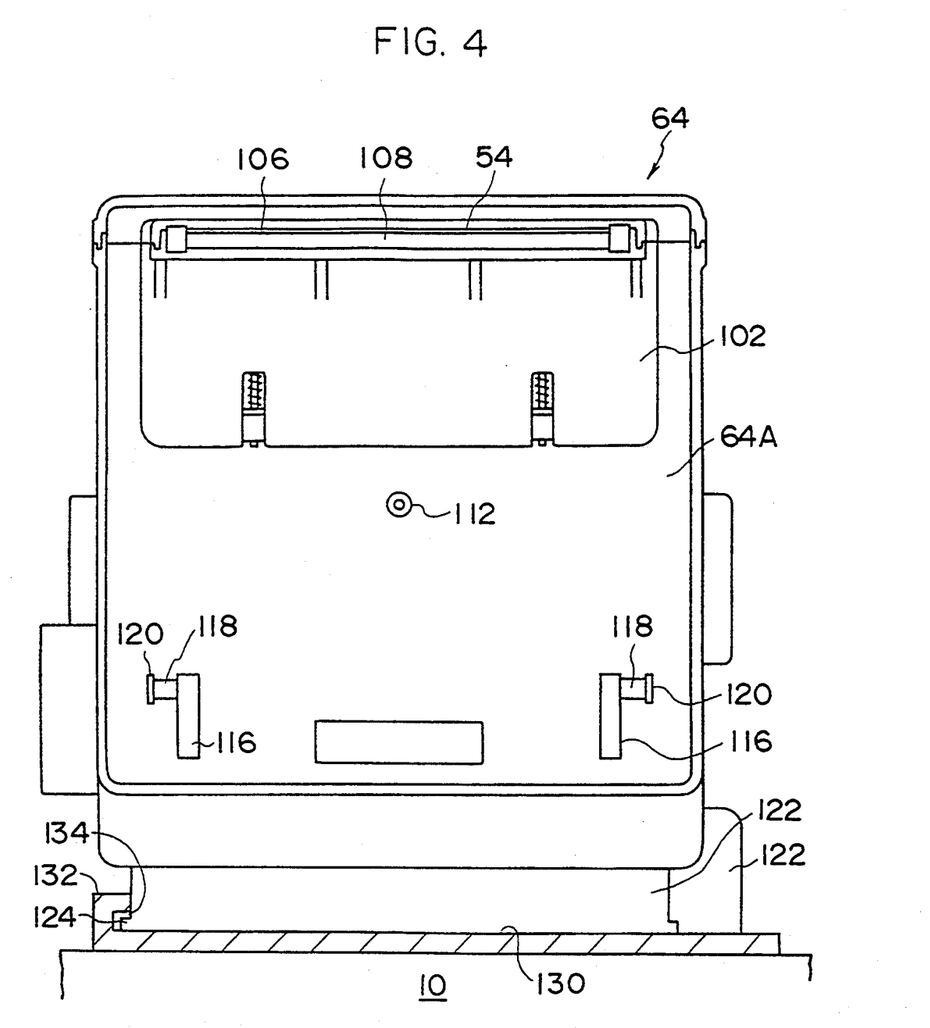
FIG. 4 is a front view showing a paper magazine according to the first embodiment of the present invention.

Along the front and rear of a bottom portion of the paper magazine 64, a pair of legs 122 are fixedly attached each extending in the left to right direction of the paper magazine 64 as seen from FIG.3. A projection 124 is formed on each of the pair legs 122. Here, only the projection 124 of the front leg is shown in FIG. 4.

A magazine table 130 is attached to the printer processor 10 such that the upper side of the table 130 is at a right-angle relative to the plane defined by the magazine attachment portion 60. A guiding member 132 is formed on the magazine table 130 (on the left side in FIG. 4). This guiding member 132 extends upwardly and is elongated in a direction normal to the document of FIG. 4. A recess 134 is formed at a lower end portion of the guiding member 132 so as to mate with the projection 124 provided on the paper magazine 64.

Figure 2:
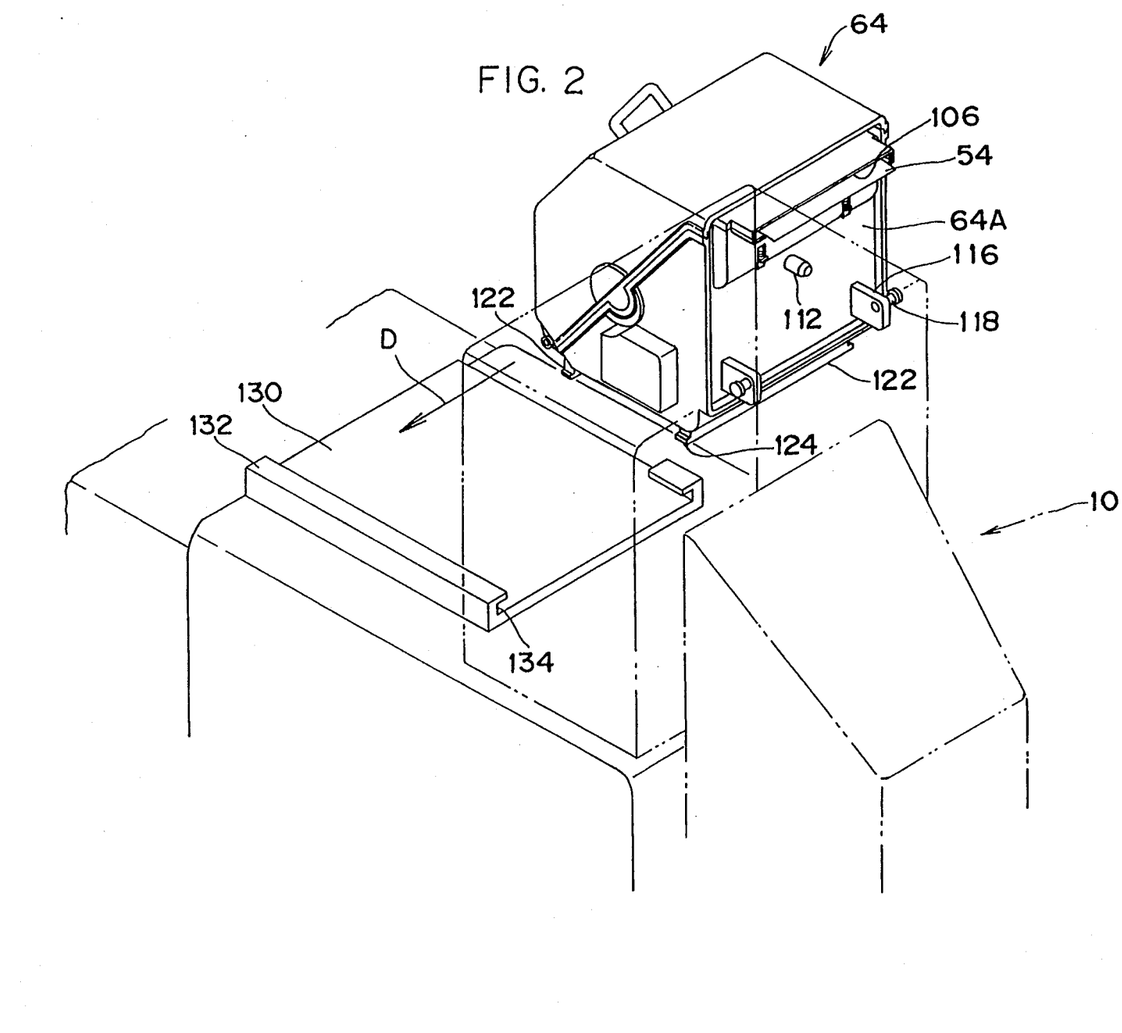
FIG. 2 is a perspective view showing a paper magazine according to the first embodiment of the present invention.

Specifically, an operator pushes the paper magazine 64 placed onto the magazine table 130 in the longitudinal direction of the legs 122 as indicated by arrow D in FIG. 2 until the left ends of the legs 122 abut against guiding member 132. In this position, the projection 124 of the paper magazine 64 will mate with the recess 134 of the guiding member 132 so as to be coupled.

Subsequently, in order to abut the front side 64A of the paper magazine 64 against the magazine attachment portion 60 the operator pushes the paper magazine 64 forward (in an extending direction of the guiding member 132). By this movement, the elongated hole 138 in the magazine attachment portion 60 receives the positioning pin 112 while the pair of L-shaped holes 140 receive respective positioning plates 116 and engaging shafts 118. As a result the front surface side 64A of the paper magazine 64 is brought into contact with the attachment face 61A of the magazine attachment portion 60 to complete the attachment of the paper magazine 64 to the printer processor 10. At this time, the engaging claws 146 disposed inside the printer processor 10 engage respective engaging shafts 118 to maintain an attached state.

Figure 5:
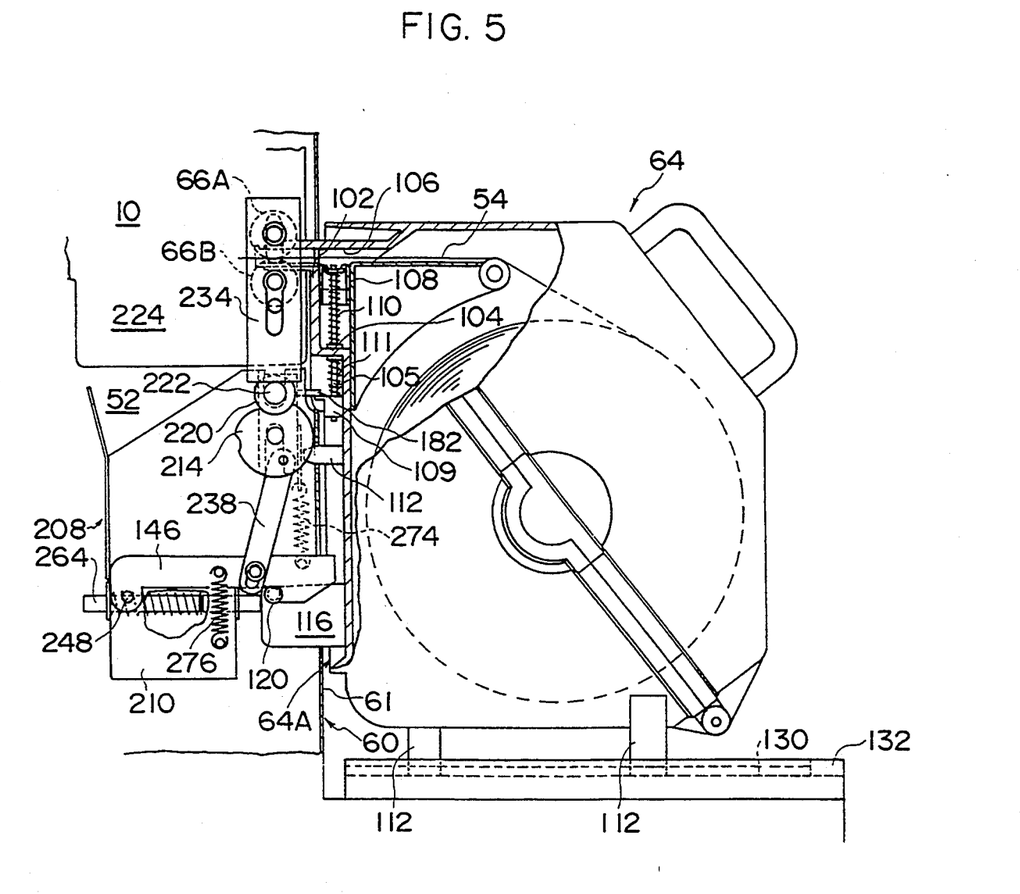
FIG. 5 is a side view showing a paper magazine and the vicinity of the attachment portion of the magazine in accordance with the first embodiment of the present invention.
Figure 6:
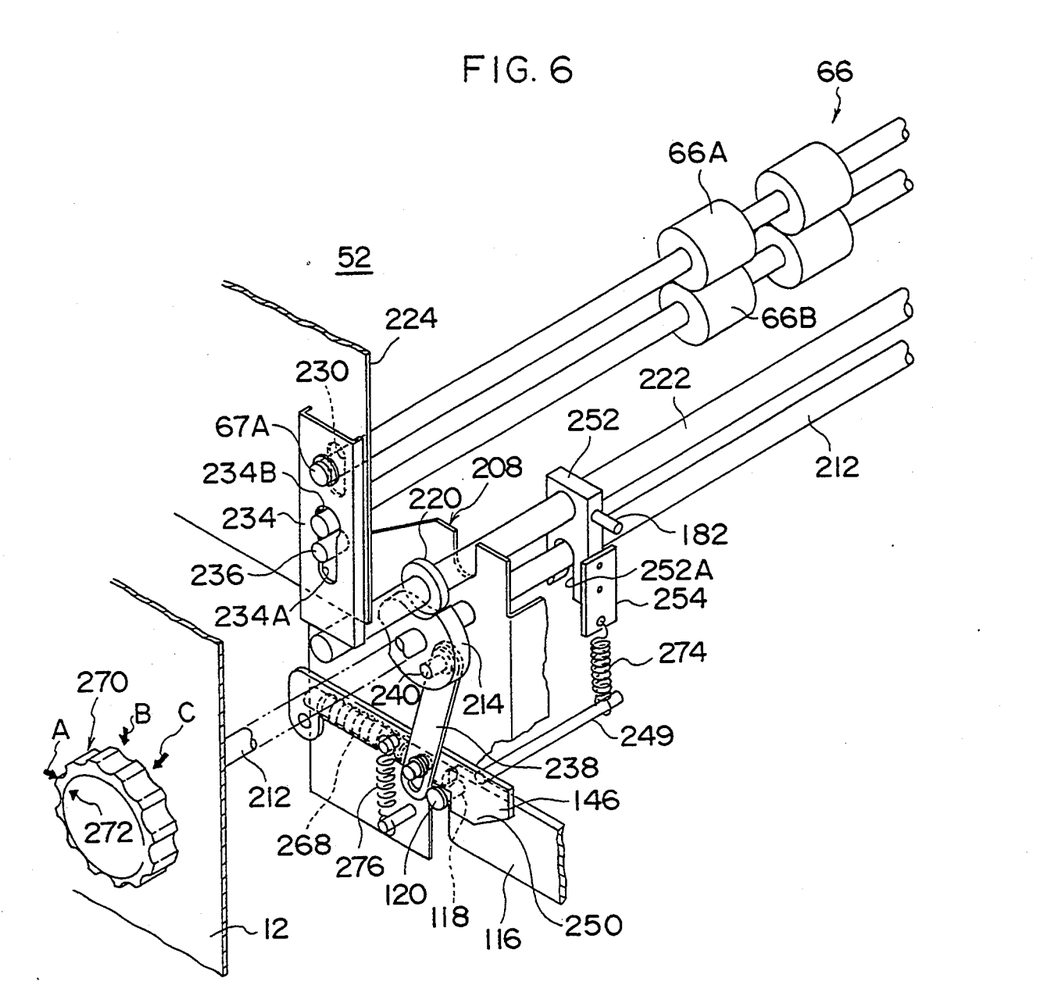
FIG. 6 is a partial perspective view showing essential parts according to the first embodiment of the present invention.
Figure 7:
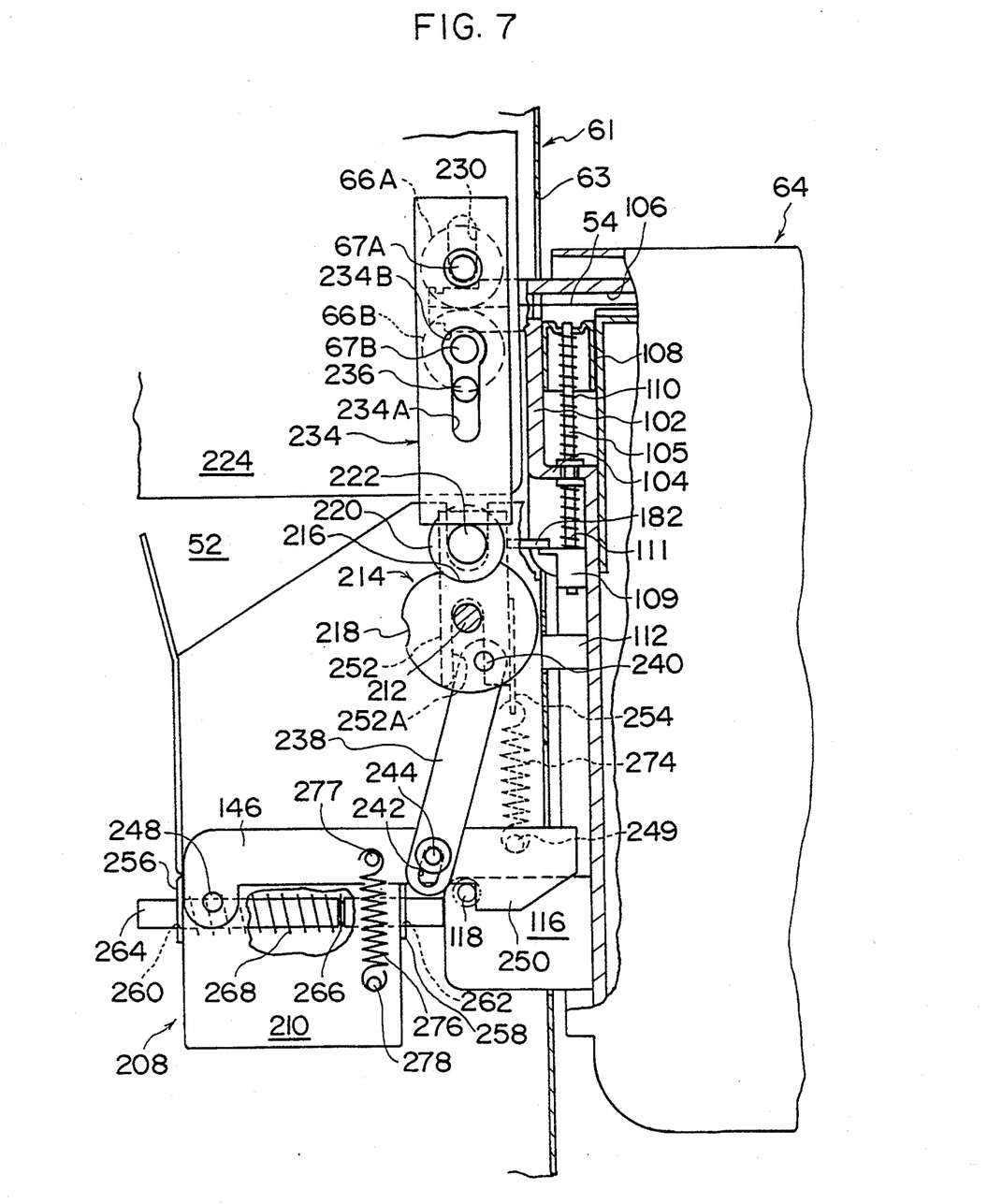
FIG. 7 is a partially enlarged sectional side view showing essential parts according to the first embodiment of the present invention, where printing paper is nipped between rollers.

Referring to FIGS. 5 to 7, a frame 208 formed by press-manufacturing or the like is disposed inside the exposure room 52 as a part of the printer processor 10. The frame 208 includes two bent side plates 210 disposed at the rear side and the front side as seen in the figures. Here the side plate at the back side 210 is not shown. A shaft member 212 is rotatably supported between and by these side plates 210. A cam 214 is secured to the shaft member 212.

The cam 214 has a recess portion 216 in its upper portion as the state shown in FIG.7. The left side of the recess portion 216 is smoothly formed so that the cam 214 can rotate in a clockwise direction. As shown in FIG. 7, a recess portion 218 which is shallower than recess portion 216 is formed in the cam 214 at 90 degrees in the counterclockwise direction from the recess 216 so that when the recess portion 218 is engaged the cam 214 stops.

Positioned above the cam 214 is a cam follower 220 which abuts against the peripheral surface of the cam 214. This cam follower 220 is rotatably supported by a supporting shaft 222.

Above the supporting shaft 222 there is a pair of supporting plates 224 (the supporting plate 224 at the back side is not shown) for rotatably supporting a lower side roller 66B of a pair of rollers 66. The upper roller 66A which is the upper roller of the pair of rollers 66 has shaft ends 67A. Each of the supporting plates 224 has a vertically elongated hole 230 positioned so as to correspond to the position of the shaft end 67A of the upper roller 66A. Each shaft end 67A of the upper roller 66A is inserted through the corresponding elongated hole 230.

The inserted shaft ends 67A are rotatably supported by coupling plates 234. In each of these coupling plates 234, a circular hole 234B is formed into which a shaft end 67B of the lower roller 66B is inserted so as to be loose. The coupling plate 234 further has a vertically elongated hole 234A connected to the circular hole 234B. A guide pin 236 is inserted into this elongated hole 234A. One end of an unillustrated coil spring is hooked to the upper roller 66A so as to urge the upper roller 66A against the lower roller 66B.

Accordingly, the movement of the guide pin 236 is guided vertically by the coupling plate 234 while the coupling plate 234 is pressed against the side of the supporting shaft 222 by the urging force of the coil spring. As a result, the coupling plate 234 moves up and down in accordance with the rotation of the cam 214.

As shown in FIGS. 6 and 7, a bracket 252 is secured to a supporting shaft 222. This bracket 252 has an engaging pin 182 projectingly attached thereto which interlocks with the engaging member 109 of the magazine 64. A plate member 254, to which an upper end of a coil spring 274 is attached, is fixed to a lower portion of the bracket 252. Further, a vertically cut-out slit 252A is formed in the lower part of the bracket 252. A shaft member 212 is inserted through this slit 252A.

Accordingly, the coil spring 274 pulls the cam follower 220 toward the cam 214 via the plate member 254 and the bracket 252 so that the cam follower 220 presses against the cam 214. In this instance, the bracket 252 guides the shaft member 212 which is in the slit 252A.

In the arrangement described above, when the cam 214 rotates, the rotation is transmitted through the cam follower 220, the supporting shaft 222, coupling plate 234 and bracket 252 so that nipping and separating actions of the rollers 66 can be effected integrally and simultaneously with the opening and closing operation of the stopper 108 for opening and closing the opening portion 106 of the magazine 64. Accordingly the cam follower 220, supporting shaft 222, coupling plate 234 and bracket 252 serve as coupling member.

On the other hand, an end of an arm 238 is coupled to the cam 214 via a shaft member 240 in such a manner as to be pivotable. A slotted hole 242 elongated in a direction along which the arm 238 stretches is formed in the other end of the arm 238. A fixing pin 244 is fitted through the slotted hole 242 so as to secure an engaging claw 146. This engaging claw 146 is positioned so as to stretch horizontally as seen in FIG. 7. The left end (as seen from figure) of the engaging claw 146 is rotatably supported via a rotary shaft 248 by side plates 210 of the frame 208.

A spring hooking pin 249 is fixed to the right side of the engaging claw 146 for hooking the lower portion of the coil spring 274 thereto. The engaging claw 146 is also formed with a projection portion 250 which projects from a lower side thereof. The left side edge of projection 250 is formed perpendicular to the longitudinal direction of the engaging claw 146 whereas the right side edge is beveled.

A spring hooking pin 277 is attached to an intermediate portion of the engaging claw 146. A coil spring 276 which has a stronger resilience than the coil spring 274 is stretched between the spring hooking pin 277 and another spring hooking pin 278 located on the side plate 210 which is lower than the engaging claw 146. Therefore, the engaging claw 146 is continually urged in a clockwise direction about the rotary shaft 248 by the coil spring 276 opposing the resilient force of the coil spring 274.

On the other hand, plate pieces 256, 258 are formed as shown in FIG. 7 by respectively bending each of the side plates 210 at a left side, middle portion thereof. Through holes 260, 262 are respectively provided in the plate pieces 256 and 258. Inserted through and between these through holes 260 and 262 is a pushing pin 264 which is formed with an annular groove 266 in an intermediate portion along the longitudinal direction of the pushing pin 264. A coil spring 268 is wound around the pushing pin 264 between the groove 266 and the plate piece 256 with its one end engaged in the groove 266, so that the coil spring 268 continually presses the pushing pin 264 toward the right side.

An end of the shaft member 212 (shown in the lower left of FIG. 6), is fixed to a knob 270. By rotating the knob 270 the rotation is transmitted through the shaft member 212 so as to rotate the cam 214. There is a mark 272 on the knob 270 which corresponds to three arrows A, B and C that are imprinted on the casing 12. When the mark 272 is oriented to point at arrow A among these arrows A, B and C, the cam 214 is positioned to rotate as shown in FIG. 7. When the mark 272 is oriented to the arrow B, the cam 214 takes a rotational position shown in FIG. 8. When the mark 272 is oriented to the arrow C, the cam 214 takes a rotational position shown in FIG. 9.

Accordingly, the shaft member 212, cam 214 and knob 270, etc., constitute an operation assembly attached operatively to the printer processor 10. As a result, the rotation of the knob 270 causes the cam follower 220 to move up and down.

More specifically, if the magazine 64 is attached to the printer processor 10 while the mark 272 of the knob 270 is rotated at a position pointed by arrow B, the engaging shaft 118 is inserted along the bevel of the engaging claw 146. As a result, as the right end of the engaging claw 146 is pushed upward relative to the rotary shaft 248 as a rotational center, the engaging shaft 118 is inserted. When the engaging shaft 118 finally reaches the left surface side of the projection 250, the right side of the engaging claw 146 is lowered by the coil spring 276 so that the engaging shaft 118 engages the left surface side of the projection 250. In this instance, the positioning plate 116 presses the pushing pin 264 down toward the left side against the urging force of the coil spring 268.

After the magazine 64 is mounted, the knob 270 is rotated to such a position that the mark 272 points to arrow A. This rotation causes the cam follower 220 to fit into recess 216 which is deeper than the recess 218, whereby the cam follower 220 is pushed down by the coil spring 274. With this movement, the coupling plates move 234 downward and the upper roller 66A moves downward so as to nip an end of the printing paper 54 extending from the magazine 64. Further, the engaging pin 182 moves downward so as to push down the engaging member 109. Consequently, the stopper 108 moves downward so as to open the opening portion 106.

Next, the operation of the present embodiment will be described.

First, normal print-processing procedures by the printer processor 10 will be explained.

The printer paper 54 is in advance conveyed to and positioned in the exposure room 52. Upon the start of processing, the negative carrier 18 is driven so that the negative 16 may be set in position. Then a light source 38 is turned on. The LATD (large area transmittance density) of an image frame on the negative film 16 to be printed is measured by a density meter 56. An exposure correction value is determined based on the measured data and data manually inputted by a keyboard. The amount of exposure (exposing time) is calculated from the exposure correction value so as to obtain an optimal exposure condition. Following the thus determined exposure condition, the filters C, M and Y located in the optical axis will be moved.

Next, the shutter 50 is opened. This operation allows the light beam emitted from the light source 38 to reach the exposure room 52 by passing through the filter portion 40 and the negative film 16 so as to begin printing the image on the negative film 16 onto the printing paper 54 that is positioned in the exposure room 52. After the lapse of a predetermined exposure time, the shutter 50 is closed. Finally, a cut mark is made on the printing paper 54 and thereafter the printing paper 54 is conveyed by one image frame. Thus, the printing process of one image frame of the negative film 16 is completed. The printing paper 54 with its print processed portions is successively conveyed to the processor portion 72 by repeating the above operations.

The printing paper 54 which was fed into the processor portion 72 is developed in the color developing portion 74 by being immersed in developer. The developed printing paper 54 is conveyed to the bleach-fixing portion 76 so as to be subjected to bleaching and fixing. The fixed printing paper 54 is then conveyed to the rinsing portion 78 where it is washed. The washed printing paper 54 is next conveyed to the drying portion 80 so as to be dried.

After the drying, cut marks on the printing paper 54 are detected so as to cut the printing paper 54 into image frames one by one in the cutter portion 84. The cut sheets are then classified by the sorter 90.

On the other hand, before beginning the process described above it is necessary for the operator to place the paper magazine 64 accommodating the printing paper 54 onto the magazine table 130 and then slide the paper magazine 64 on the magazine table 130 so as to be mounted at a predetermined position. In other words, the magazine 64 which is capable of accommodating and supplying the printing paper 54 is detachably mounted to the magazine table 130 in the printer processor 10. In this state, the long-rolled printing paper 54 is successively fed from the magazine 64 into the printer processor 10.

When the paper magazine 64 is being mounted, the projections 124 formed on the paper magazine 64 engage the recesses 134 formed on the magazine table 130 so that the paper magazine 64 is prevented from moving vertically from the magazine table 130.

The positioning pin 112 projecting from the front surface side 64A of the paper magazine 64 facing to the attachment face 61A of the printer processor 10 is fit into the elongated hole 138 in the printer processor 10, thereby laterally positioning the paper magazine 64. Moreover, the positioning plates 116 projecting from the front surface side 64A of the paper magazine 64 facing the attachment face 61A of the printer processor 10 are fit into the respective L-shaped holes 140 in the printer processor 10. Therefore, it is possible to prevent the paper magazine 64 from being inclined or angled against the attachment face 61A of the printer processor 10 with respect to an axial direction extending vertically. This provides further improvement in positional accuracy of the mounted state of the paper magazine 64.

Accordingly, the paper magazine 64 capable of accommodating and supplying a long-rolled of printing paper 54 can be positioned with high precision relative to the printer processor 10, so that the printing paper 54 can be fed properly when the printing paper 54 is conveyed to be processed from the paper magazine 64 to the printer processor 10.

In the case where the paper magazine 64 is mounted to the printer processor 10, the operation is as follows.

Figure 8:
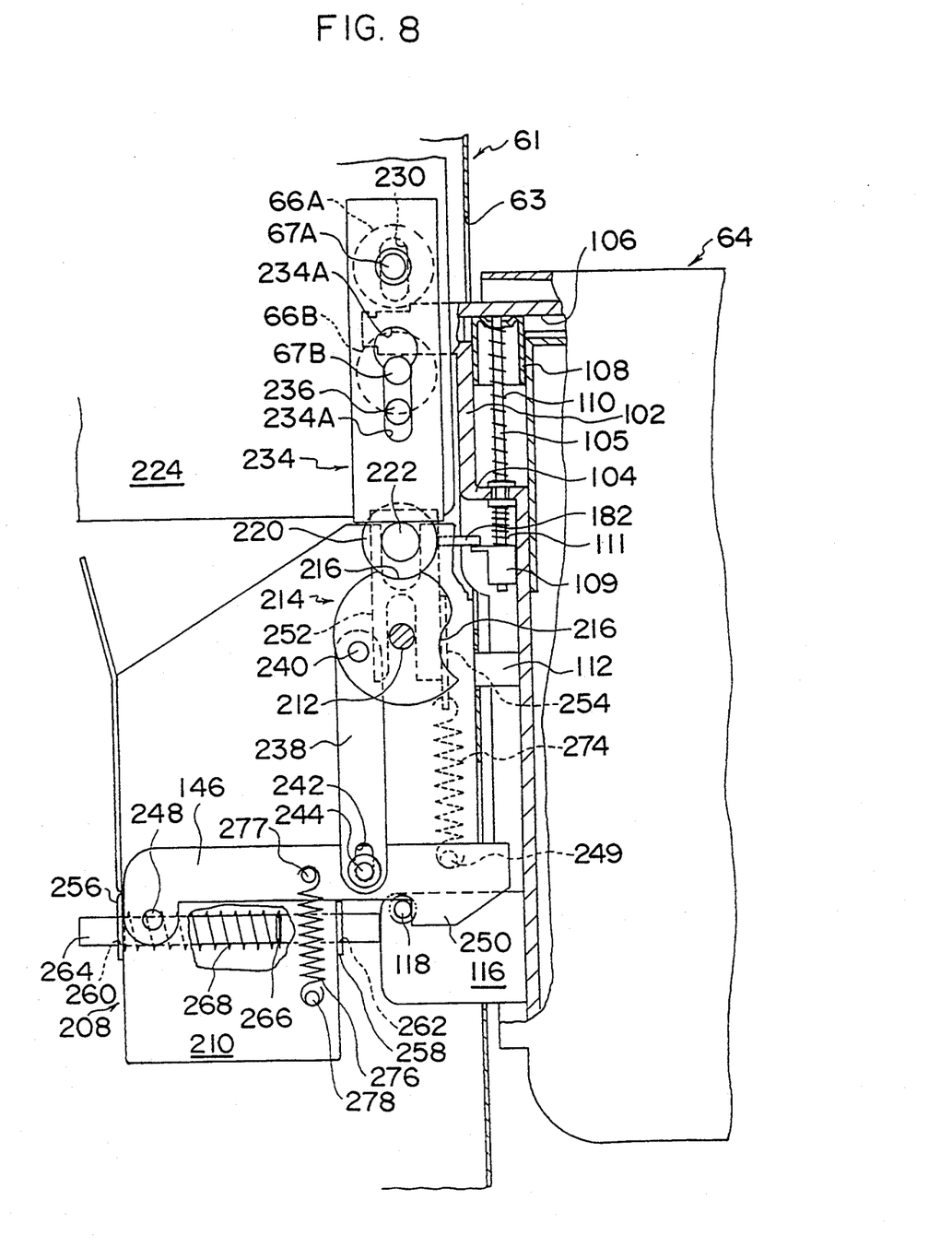
FIG. 8 is a partially enlarged sectional side view showing essential parts according to the first embodiment of the present invention, where printing paper is not nipped between rollers.

The mark 272 on the knob 272 shown in FIG. 6 is set in advance to the arrow B. When the paper magazine 64 is fit into the printer processor 10, the rotary shaft 248 is pushed down and the engaging shaft 118 moves while abutting the bevel at the distal end side of the engaging claw 146. Consequently, the distal end side of the engaging claw 146 is pushed up. Finally the engaging shaft 118 engages the projection 250 on the left surface side as shown in FIG. 8. More specifically, the engaging shaft 118 which is integrally formed in the paper magazine 64 engages the engaging claw 146 of the printer processor 10, whereby the paper magazine 64 is fixed to the printer processor 10.

When the operator rotates the knob 270 linked with the cam 214 to position the mark 272 at the arrow A shown in FIG. 6, the cam 214, abutting the cam follower 220, rotates so that the recess 216 shifts upward. This movement moves the cam follower 220 down, and therefore the supporting shaft 222. The engaging pin 182 on the bracket 252 lowers together the supporting shaft 222. Accordingly, the engaging member 109 engaged by the engaging pin 182 lowers whereby the stopper 108 connected to the engaging member 109 drops so as to release the opening portion 106.

Specifically, the engaging pin 182 on the side of the printer processor 10 engages the stopper 108, which opens and closes to cover the opening portion 106 thorough which the printing paper 54 is drawn out of the paper magazine 64, so as to shift the stopper 108 to free the opening portion 106.

On the other hand, the upper roller 66A linked through the supporting shaft 222 and the coupling plate 234 moves downward as the cam follower 220 is lowered. Accordingly, the upper roller 66A in cooperation with the lower roller 66B nips the end of the printing paper 54 extending from the paper magazine 64. In other words, since the rollers 66 comprising a pair of rollers 66A and 66B are supported in the printer processor 10, so as to close and separate the end of the printing paper 54 extending from the paper magazine 64 can be nipped.

To sum up, as the cam follower 220 moves downward, the opening portion 106 integrally opens and the rollers 66 may nip the end of the printing paper 54.

On the other hand, when the paper magazine 64 is to be removed from the printer processor 10, the following operation should be done.

By rotating the knob 270 so that the mark 272 is moved from the position indicated by arrow A to the position indicated by arrow B, the rotation is transmitted via the shaft member 212 to the cam 214 as shown in FIG. 8. This rotation causes the cam 214 to raise the cam follower 220. Accordingly the engaging pin 182 and the upper roller 66A rise. As a result, in contrast to the above the opening portion 106 is integrally closed while the rollers 66 separate from each another.

Figure 9:
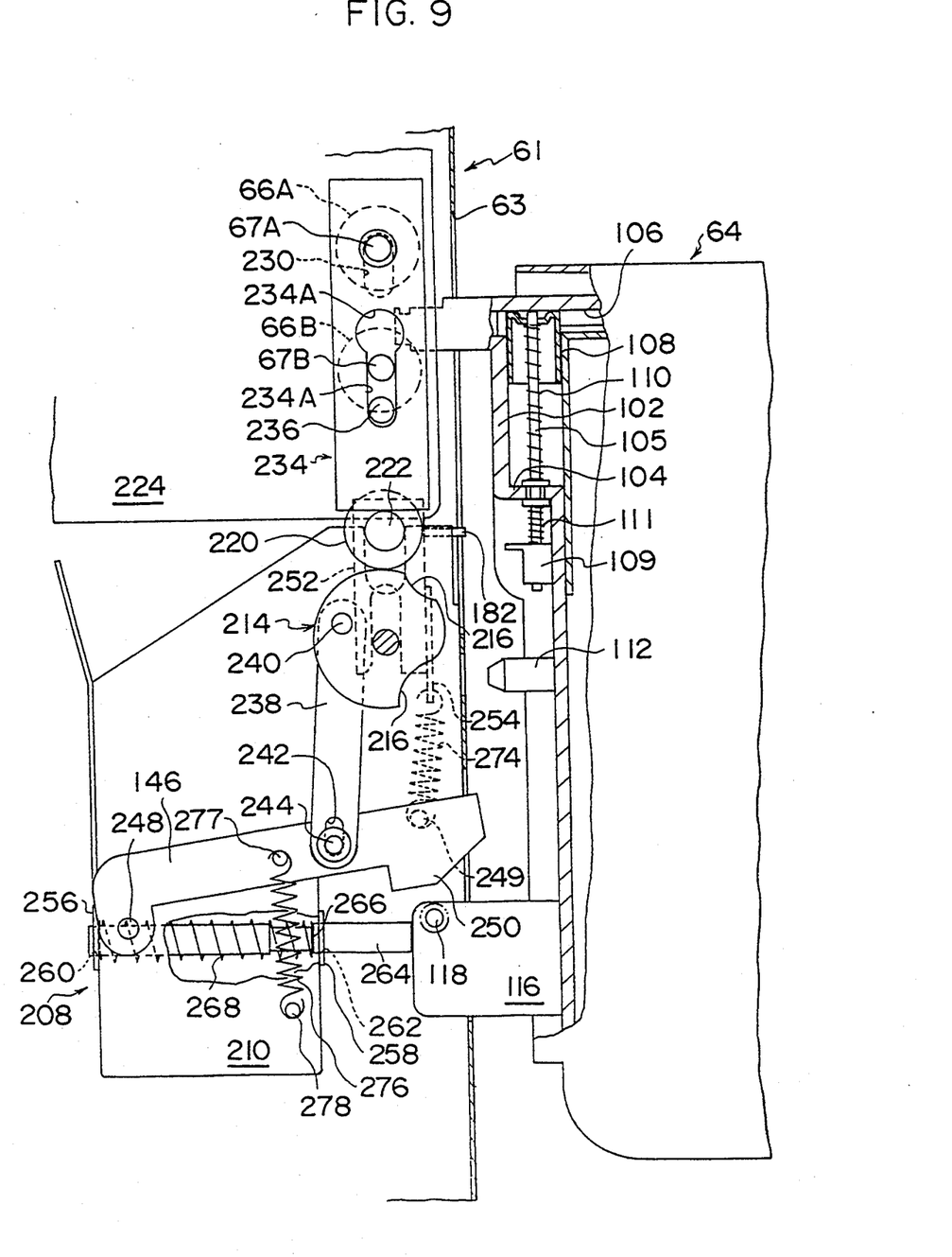
FIG. 9 is a partially enlarged sectional side view showing essential parts according to the first embodiment of the present invention, where engagement by an engaging claw is released.

Further, when the knob 270 is rotated from this position so that the mark 272 is at the arrow C, the arm 238 rises at one end as shown in FIG. 9. This causes the lower side of the elongated hole 242 to push the engaging pin 244 engaged with the slotted hole 242 upward on the other side of the arm 238. Therefore, the engaging claw 146 rotates in a counterclockwise direction about the rotary shaft 248 in opposition to the resilient force of the coil spring 276. This rotation raises the end side of the engaging claw 146 so to release engagement. Accordingly, the engagement of the engaging claws 146 with the pins 118 is freed so that the lock for the paper magazine 64 can be released from the printer processor 10.

At the same time, the pushing pin 264 is pushed rightward by virtue of the coil spring 268 so as to press the positioning plate 116. Consequently, the paper magazine 64 may be separated from the printer processor.

As described herein, the photosensitive material processing apparatus according to the present invention has advantages in that upon the attachment of the magazine to the apparatus body it is possible to integrally nip the photosensitive material by the conveying rollers, secure the magazine and open and close the shutter.

What is claimed is:

1. A photosensitive material processing apparatus comprising:
   an apparatus main body for processing a long roll of photosensitive material as the material is being conveyed;
   a magazine which can be detachably mounted to said apparatus main body for accommodating said photosensitive material and supplying said photosensitive material to said apparatus main body;
   a shutter capable of opening and closing an opening portion through which said photosensitive material is drawn from said magazine;
   an opening and closing claw, moveably supported in said apparatus main body for opening and closing said shutter, and engaging said shutter so as to move said shutter upon the mounting of said magazine;
   conveying rollers supported in said apparatus main body for nipping said photosensitive material protruding from said magazine when said magazine is mounted, said conveying rollers being capable of moving toward and away from each other;

a coupling member disposed for coupling between said opening and closing claw and said conveying rollers and moving reciprocally so as to effect an operation of moving said opening and closing claw simultaneously with one of an operation of moving said conveying rollers toward each other for causing said conveying rollers to nip said photosensitive material and an operation of causing said conveying rollers to separate from one another; and an operation assembly for moving said coupling member back and forth while abutting against said coupling member so as to move said opening and closing claw and effect nipping and separation actions of said conveying rollers.

2. A photosensitive material processing apparatus according to claim 1 wherein said apparatus main body comprises a printer processor which effects print processing and developing of images of a negative film onto said photosensitive material.

3. A photosensitive material processing apparatus according to claim 1 wherein said magazine comprises a paper magazine which accommodates printing paper, as the photosensitive material, wound on a reel and is capable of supplying the printing paper to said apparatus main body.

4. A photosensitive material processing apparatus according to claim 1 wherein said magazine comprises a spring pressing said shutter against said opening portion side while said shutter pressed by said spring fixedly nips one end of said photosensitive material and prevents light from entering inside of said magazine.

5. A photosensitive material processing apparatus according to claim 1 wherein said shutter is U-shaped in cross-section and is formed greater in width than said photosensitive material, said shutter coming into contact with said photosensitive material in an intermediate portion of the U-shaped so as to nip said photosensitive material at said opening portion and preventing light from entering the inside of said magazine.

6. A photosensitive material processing apparatus according to claim 1 wherein said opening and closing claw is composed of an engaging pin capable of engaging said shutter when said magazine is mounted to said apparatus main body, and said engaging pin moving back and forth in accordance with the forward and return movement of said coupling member to thereby open and close said shutter.

7. A photosensitive material processing apparatus according to claim 1 wherein said conveying rollers are composed of a pair of rollers capable of nipping and conveying said photosensitive material.

8. A photosensitive material processing apparatus according to claim 1 wherein said conveying rollers are composed of a pair of rollers, one of said rollers being rotatably supported by said coupling member so that the movement of said coupling member back and forth causes said pair of rollers to move forward and away from one another respectively.

9. A photosensitive material processing apparatus according to claim 1 wherein said operation assembly is composed of a shaft member with a knob allowing external operation and a cam abutting against said coupling member, rotation of said cam via said knob causes said coupling member to move back and forth so as to effect movement of said opening and closing claw and perform nipping and separating actions of said conveying rollers.

10. A photosensitive material processing apparatus according to claim 1 wherein said operation assembly is composed of a shaft member with a knob allowing external operation and a cam abutting against said coupling member, a portion of said coupling member abutting said cam is a cam follower, and rotation of said cam via said knob causes said coupling member to move back and forth so as to effect movement of said opening and closing claw and perform nipping and separating actions of said conveying rollers.

11. A photosensitive material processing apparatus according to claim 1 wherein said operation assembly is composed of a shaft member with a knob allowing external operation and a cam abutting against said coupling member, said opening and closing claw being supported for back and forth movement while being guided by said shaft member, and rotation of said cam via said knob causing said coupling member to move back and forth, whereby said opening and closing claw moves back and forth so as to open and close said shutter.

12. A photosensitive material processing apparatus comprising:

an apparatus main body for processing a long-rolled photosensitive material as the material is being conveyed;

a magazine which can be detachably mounted to said apparatus main body for accommodating said photosensitive material and supplying said photosensitive material to said apparatus main body;

an engaging projection integrally formed with said magazine;

an engaging claw which is supported in said apparatus main body and couples with said engaging projection when said magazine is mounted to said apparatus main body so as to fix said magazine to said apparatus main body;

a shutter capable of opening and closing an opening portion through which said photosensitive material is drawn from said magazine;

an opening and closing claw, movably supported in said apparatus main body for opening and closing said shutter, and engaging said shutter so as to move said shutter upon the mounting of said magazine;

conveying rollers supported in said apparatus main body in such a manner as to draw close to and separate from each other and being capable of nipping said photosensitive material protruding from said magazine when said magazine is mounted; and an operation assembly which is linked with said engaging claw so as to release the engagement of said engaging claw to thereby free the interlock of said magazine with said apparatus main body and which is connected respectively to said opening and closing claw and said conveying rollers so as to move said opening and closing claw and effect nipping and separating actions of said conveying rollers.

13. A photosensitive material processing apparatus according to claim 12 wherein said engaging projection is composed of a shaft-like member formed on a positioning plate for positioning said magazine relative to said apparatus main body when said magazine is mounted to said apparatus main body, and said shaft-like member is adapted to engage said engaging claw disposed on the side of said apparatus main body.

14. A photosensitive material processing apparatus according to claim 12 wherein said engaging projection is composed of a shaft-like member having a flange at an end thereof so that said flange may prevent said engaging projection from disengaging from said engaging claw while said shaft-like member engages said engaging claw of said apparatus main body.

15. A photosensitive material processing apparatus according to claim 12 wherein said engaging claw has a supported portion at one end thereof and is supported rotatably by said apparatus main body, said engaging claw is formed with a projection at the end thereof for engaging said engaging projection.

16. A photosensitive material processing apparatus according to claim 12 wherein said operation assembly is composed of a shaft member with a knob allowing external operation and a cam abutting against said coupling member and an arm coupling said cam and said engaging claw, and said arm rotates said engaging claw in accordance with the rotation of said knob so as to release the engagement between said engaging claw and said engaging projection to thereby free the lock of said magazine to said apparatus main body.

* * * * *